(12) United States Patent
Shuaib et al.

(10) Patent No.: US 9,067,279 B1
(45) Date of Patent: Jun. 30, 2015

(54) APPARATUS FOR JOINT SEALING USING TUBE EXPANSION AND FRICTION WELDING

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Abdelrahman Nasr Shuaib, Dhahran (SA); Nesar Merah, Dhahran (SA); Fadi A. A. Al-Badour, Dhahran (SA); Abdelaziz Bazoune, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/242,836

(22) Filed: Apr. 1, 2014

(51) Int. Cl.
*B23K 20/12* (2006.01)
*F16L 13/02* (2006.01)

(52) U.S. Cl.
CPC ............... *B23K 20/129* (2013.01); *F16L 13/02* (2013.01); *B23K 20/126* (2013.01); *B23K 20/122* (2013.01)

(58) Field of Classification Search
CPC ............... B23K 20/126; B23K 20/129; B23K 37/0533; B23K 20/1255; B23K 37/0536; B23K 20/12; B23K 20/122; B23K 20/1245; B23K 20/1265; B23K 2201/06; B23K 2201/14; B21D 53/02; B23B 29/02; F28D 7/16

USPC .................................. 228/112.1, 113, 114, 2.1
See application file for complete search history.

(56) References Cited

U.S. PATENT DOCUMENTS

| | | | |
|---|---|---|---|
| 3,144,710 A | 8/1964 | Hollander et al. | |
| 3,838,807 A | 10/1974 | Nomura et al. | |
| 4,266,604 A | 5/1981 | Sumikawa et al. | |
| 4,579,171 A | 4/1986 | Stafford et al. | |
| 5,430,270 A | 7/1995 | Findlan et al. | |
| 5,540,526 A | 7/1996 | Hyatt et al. | |
| 6,703,093 B2 | 3/2004 | Foster | |
| 7,476,824 B2 | 1/2009 | Ananthanarayanan et al. | |
| 2007/0138237 A1 | 6/2007 | Nishikawa et al. | |
| 2011/0000952 A1 | 1/2011 | Takeshita et al. | |
| 2011/0127311 A1* | 6/2011 | Peterson et al. | 228/2.1 |
| 2013/0037601 A1* | 2/2013 | Eller et al. | 228/112.1 |

* cited by examiner

*Primary Examiner* — Erin Saad
(74) *Attorney, Agent, or Firm* — Richard C. Litman

(57) ABSTRACT

The apparatus for joint sealing using tube expansion and friction welding includes a friction welding apparatus including a clamping assembly and a tube expansion apparatus. A tube having a beveled edge is inserted into an aperture in a tube sheet. The tube expansion apparatus expands the end of the tube with the beveled edge to swage the tube to the sheet. A tube sleeve having an edge beveled at an angle complementary to the beveled edge of the tube is clamped to the spindle of the friction welding apparatus. The tube sleeve is abutted to the beveled edge of the tube with the application of pressure and the spindle is rotated or oscillated to friction weld the tube sleeve to the tube and the tube sheet, forming a sealed joint. The process may be repeated to form a heat exchanger tube assembly having sealed joints.

10 Claims, 9 Drawing Sheets

APPARATUS FOR JOINT SEALING USING TUBE EXPANSION AND FRICTION WELDING

BACKGROUND OF THE INVENTION

1. Field of the Invention

The present invention relates to joint sealing apparatus, and more particularly, to an apparatus for joint sealing using tube expansion and friction welding for sealing a tube to a tube sheet.

2. Description of the Related Art

In tube-tube sheet joints within a heat exchanger, the accidental mixing of two fluids or accidental leakage of hazardous fluids should be avoided at all cost. Industrial standards generally prescribe for tube-to-tube sheet rolling, followed by seal welding of the joints to provide a secure connection. Typically, the conventional tube expansion process is performed either by roller or hydraulic means. The subsequent seal welding is performed by conventional fusion welding, such as TIG Welding (Tungsten Inert Gas) or SMAW (shielded metal arc welding).

The current fusion welding processes are known to have a number of shortcomings. Several shortcomings of the fusion welding process are that fusion welding can lead to a number of discontinuities and defects in the weld, as well as distortion and residual stresses, which can be detrimental to the welded joint. Thus, an apparatus for joint sealing using tube expansion and friction welding solving the aforementioned problems is desired.

SUMMARY OF THE INVENTION

The apparatus for joint sealing using tube expansion and friction welding uses expansion and friction welding to securely seal the tube to the tube sheet. The friction welding apparatus includes a clamping assembly, including a collet and a mandrel. The collet has a base configured to receive the second end of a tube sleeve. The tube sleeve has a beveled edge at the first end. The mandrel is configured to engage with an inner wall of the tube sleeve and a portion of an inner wall of a tube. The tube has a first end having a beveled edge formed therein. The apparatus further includes a tube expansion mechanism to expand the tube and thus secure the tube in an aperture located in the tube sheet.

The tube sheet has a generally planar configuration and at least one aperture formed therein. The beveled edge of the tube end is adapted for positioning in the corresponding aperture of the tube sheet. Thereafter, the tube sheet is expanded to securely engage the tube in the tube sheet. The clamping assembly is moved to engage the beveled edge of the tube sleeve to the beveled edge of the tube, and to position the mandrel in engaging relation within the tube. The clamping assembly is rotated to friction weld the tube sleeve to the tube, and to seal the tube to the tube sheet. Thereafter, the tube sleeve is released from the clamping assembly.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
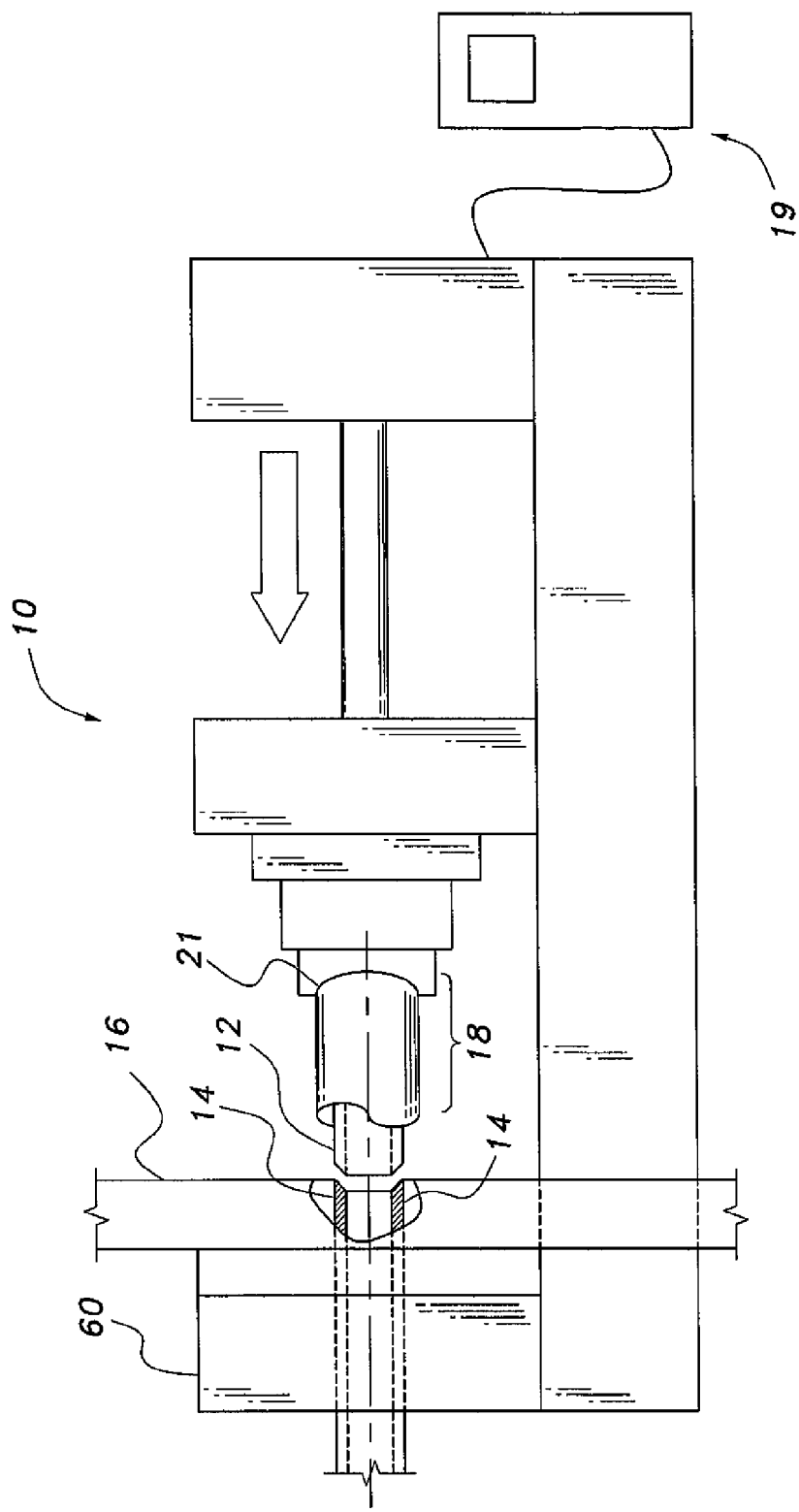
FIG. 1 is a partial environmental side view of an apparatus for joint sealing using tube expansion and friction welding according to the present invention.

Referring to FIG. 1, the apparatus for joint sealing using tube expansion and friction welding designated generally as 10 in the drawings, has a clamping assembly 18 for providing a sealed weldment for a tube-to-tube sheet joint. The apparatus 10 welds a tube stub or sleeve 12 to the tube 14, which is positioned in a tube sheet 16, in order to form a secure tube-to-tube sheet seal. The apparatus 10 further includes a tube expansion assembly 60 for expanding the tube 14 once the tube 14 is positioned in the tube sheet 16, and a controller 19 to control the welding and tube expansion processes.

Figure 2:
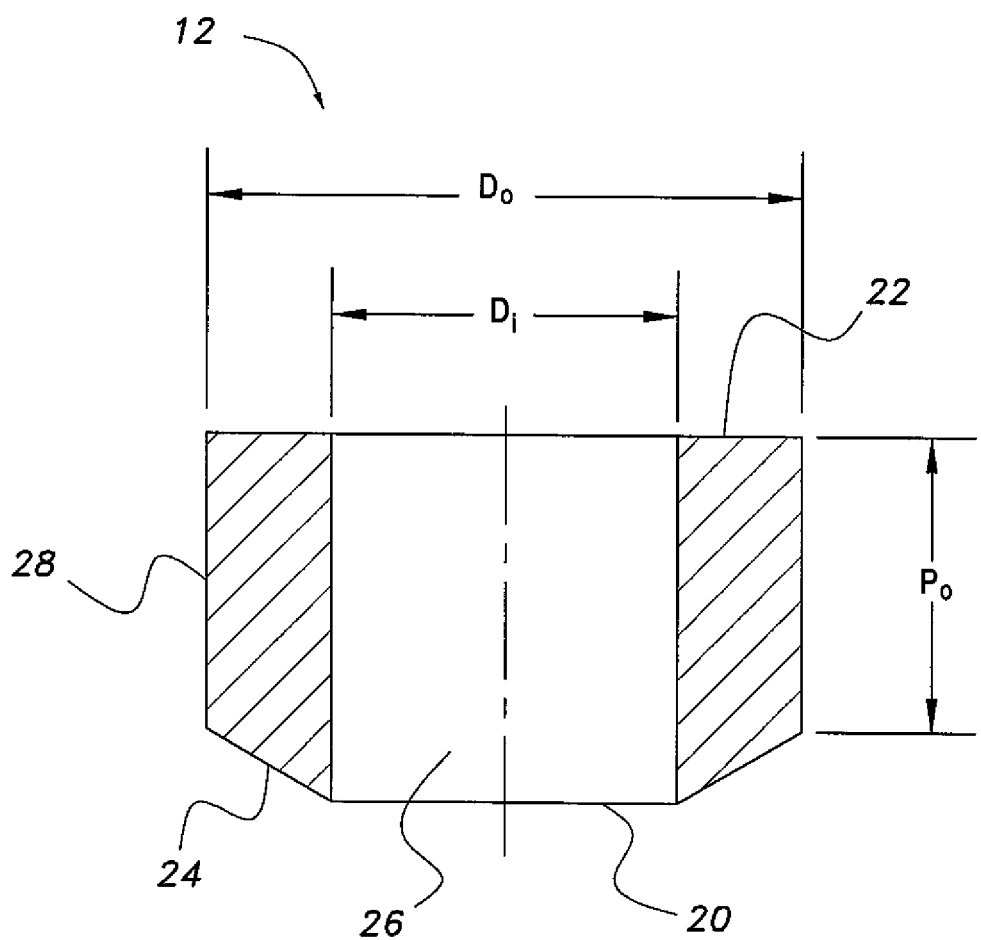
FIG. 2 is a side view in section of the tube sleeve of the apparatus for joint sealing using tube expansion and friction welding of FIG. 1.

Referring to FIG. 2, the tube sleeve 12 is adapted to be friction welded to the tube 14, and is configured for operative engagement with the clamping assembly 18 of the apparatus 10. The tube sleeve 12 has a generally cylindrical shape, including a first end 20 adapted for connection to the tube 14 and a second end 22 adapted for engagement with the clamping assembly 18. The first end 20 of the tube sleeve 12 has a beveled edge 24 configured for engagement to the tube 14 during the friction welding process.

Typically, in heat exchange applications, a conventional tube extends from a tube sheet at a desired length. Accordingly, the tube sleeve 12 has an outer wall 28 having a projection length of $P_0$, which represents the desired projection length of the tube sleeve 12 from the tube 14 when the tube sleeve 12 is in a connected position with the tube 14. Notably, it is contemplated that the projection length $P_o$ of the tube sleeve 12 can be varied in accordance with the application.

The tube sleeve 12 has a first diameter $D_o$ representing the outer diameter of the tube sleeve 12. The tube sleeve 12 has a second diameter $D_i$ representing the inner diameter of the tube sleeve 12, defining an opening 26 in the tube sleeve 12. Notably, the tube sleeve 12 can be formed by cutting a portion of the corresponding tube 14. As such, prior to expanding the tube 14, the tube sleeve 12 and tube 14, have substantially similar outer and inner diameter dimensions.

Figure 3:
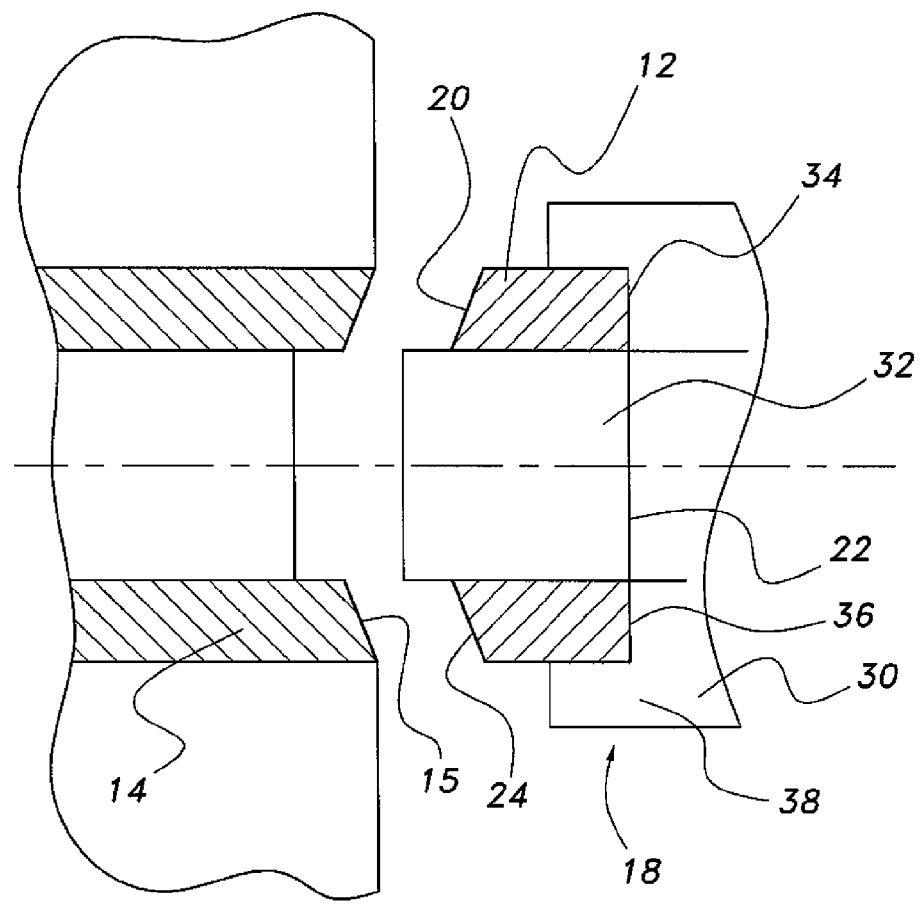
FIG. 3 is a partial side view in section of the clamping assembly and tube sleeve of the apparatus for joint sealing using tube expansion and friction welding of FIG. 1.
Figure 4:
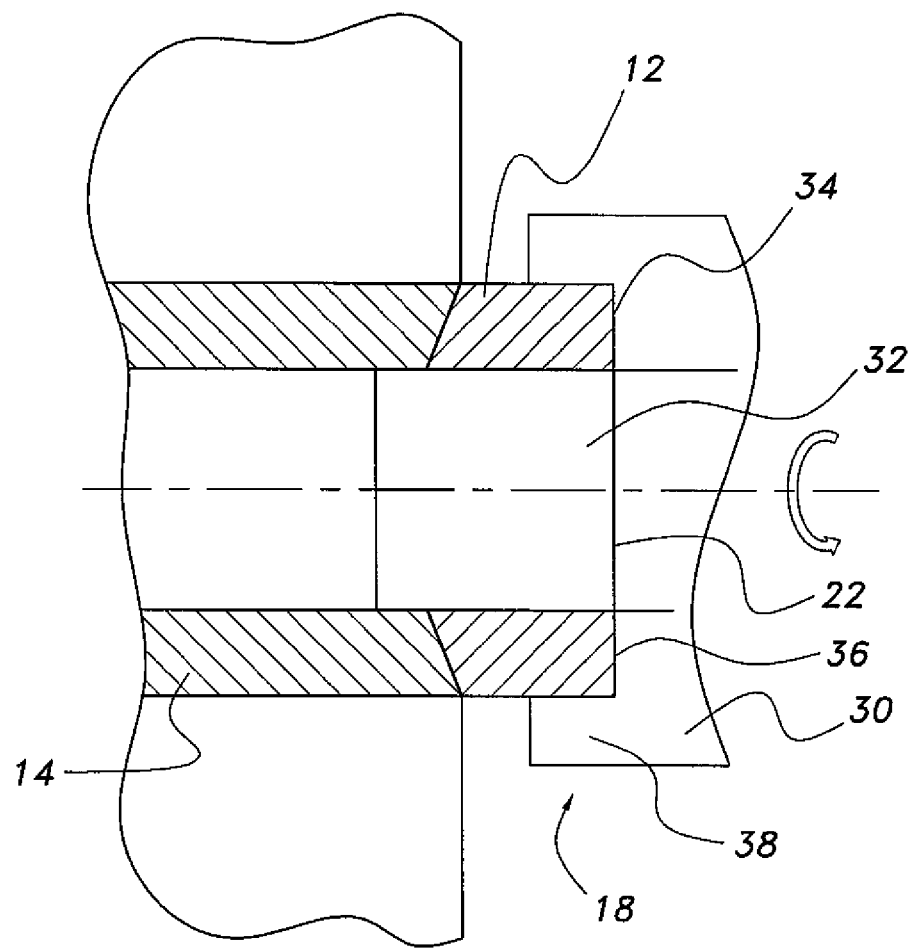
FIG. 4 is an environmental partial side view in section of the apparatus for joint sealing using tube expansion and friction welding of FIG. 1, illustrating the tube sleeve in operative engagement with the tube and tube sheet.

As shown in FIGS. 3 and 4, the clamping assembly 18 secures the tube sleeve 12 to the tube 14, and further can provide a forging force and rotational force during the friction welding process. The clamping assembly 18, including the mandrel 32 and collet 30, is configured for operative engagement with a spindle 21, as illustrated in FIG. 1. The clamping assembly 18 includes the collet 30 and mandrel 32. The collet 30 has a first end 34 defining a recess 36 that forms a gripper or collar portion 38 of the collet 30. The gripper portion is adapted to receive the second end 22 of the tube sleeve 12 therein. The gripper portion 38 of the collet 30 can exert a strong clamping force on the tube sleeve 12 to secure the tube sleeve 12 inside of the recess 36.

The mandrel 32 also has a generally cylindrical configuration. The mandrel 32 is adapted for insertion through the opening 26 formed in the tube sleeve 12. In the inserted position, the mandrel 32 extends through both the second end 22 and the first end 20 of the tube sleeve 12. When the clamping assembly 18 engages the tube 14, the mandrel 32 extends generally into the end 15 of the tube 14 beyond the contact point of the respective tube sleeve 12 and tube 14 edges, as illustrated in FIG. 4.

Figure 5:
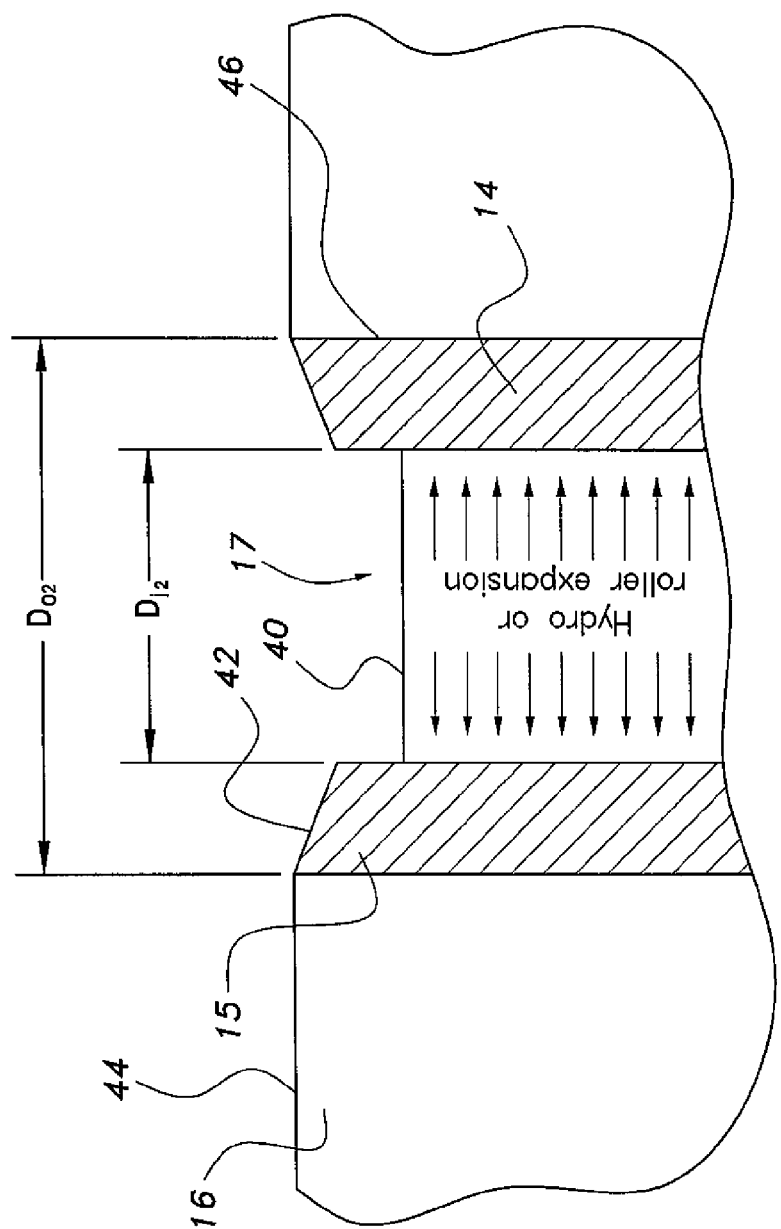
FIG. 5 is a diagrammatic partial side view in section of the apparatus for joint sealing using tube expansion and friction welding of FIG. 1, illustrating the expansion process applied to the tube while positioned in the tube sheet.

As shown in FIG. 5, the tube 14 has a generally cylindrical configuration for positioning in the tube sheet 16. The tube 14 has an outer diameter $D_{o2}$ and an inner diameter $D_{i2}$, defining a bore 40 therein. As shown in FIG. 4, the tube end 15 has a beveled edge 42 that is beveled at an angle complementary to the edge of the tube sleeve 12, being configured for engagement with the beveled edge 24 of the tube sleeve 12. Preferably, the bevel angle of the tube 14 for optimal welding can be approximately 37.5 degrees. However, it is contemplated that other bevel angles, and/or special techniques, such as J-Bevels, can also be used to achieve the desired goal. Nevertheless, in the event that the tube 14 has a flush end, instead of a beveled end, it is still contemplated that the clamping assembly 18 and gripper 38 can be used to friction weld the tube 14 and tube sheet 16 joint.

The tube 14 material should be compatible with all types of fluids for long periods under the operating conditions (temperatures, pressures, pH, etc.) of a heat exchanger to minimize deterioration, such as corrosion. The tube 14 is made of a strong, thermally conductive, corrosion-resistant, high-quality tube material, such as one or more of the following materials: copper alloy, stainless steel, carbon steel, non-ferrous copper alloy, Inconel, nickel, Hastelloy and titanium.

The tube expansion assembly 60 can be a hydraulic tube expansion assembly 60 that provides a fluid force on the inner diameter of the tube 14, thereby sealing the outer wall 46 of the tube 14 to the inner wall of opening 17 in the tube sheet 16. In another embodiment, the tube expansion assembly 60 can be a roller tube expansion assembly that inserts rollers into the tube 14 to achieve tube expansion.

Figure 6:
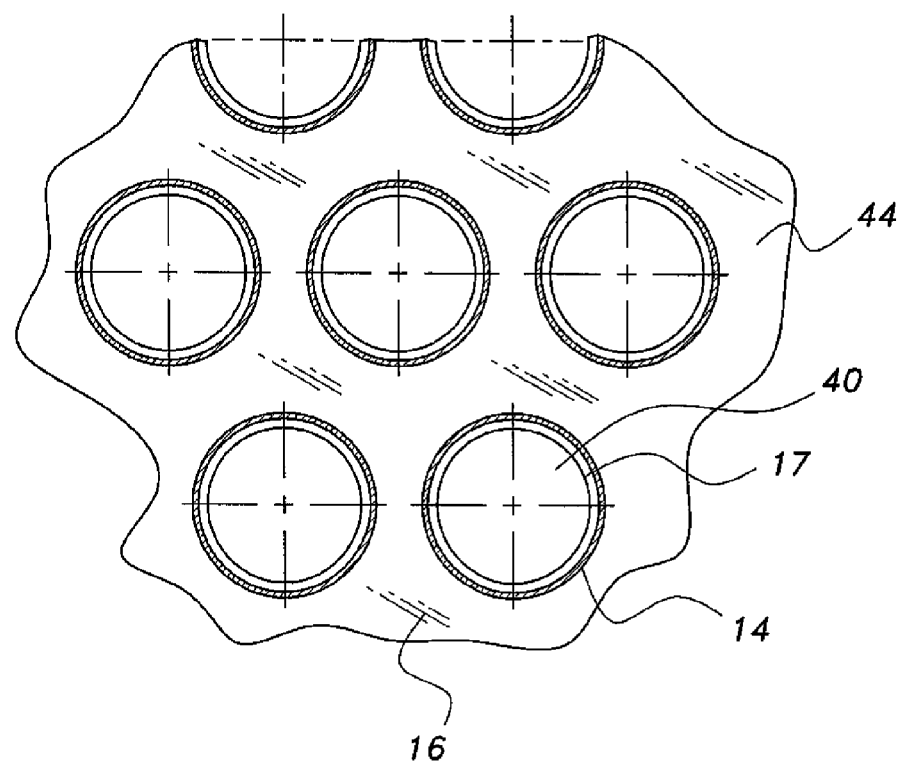
FIG. 6 is a partial plan view of a tube sheet.

As shown in FIG. 6, the tube sheet 16 has one or more apertures or openings 17 formed therein for receiving the tube 14. The openings 17 are placed relatively close to each other, having a predetermined pitch. The tube sheet 16 is generally planar and can be made of various metals. The tube sheet 16 can be covered in a cladding material, which can serves as a corrosion barrier and insulator, and further, the tube sheet 16 may also be fitted with a galvanic anode.

Figure 7:
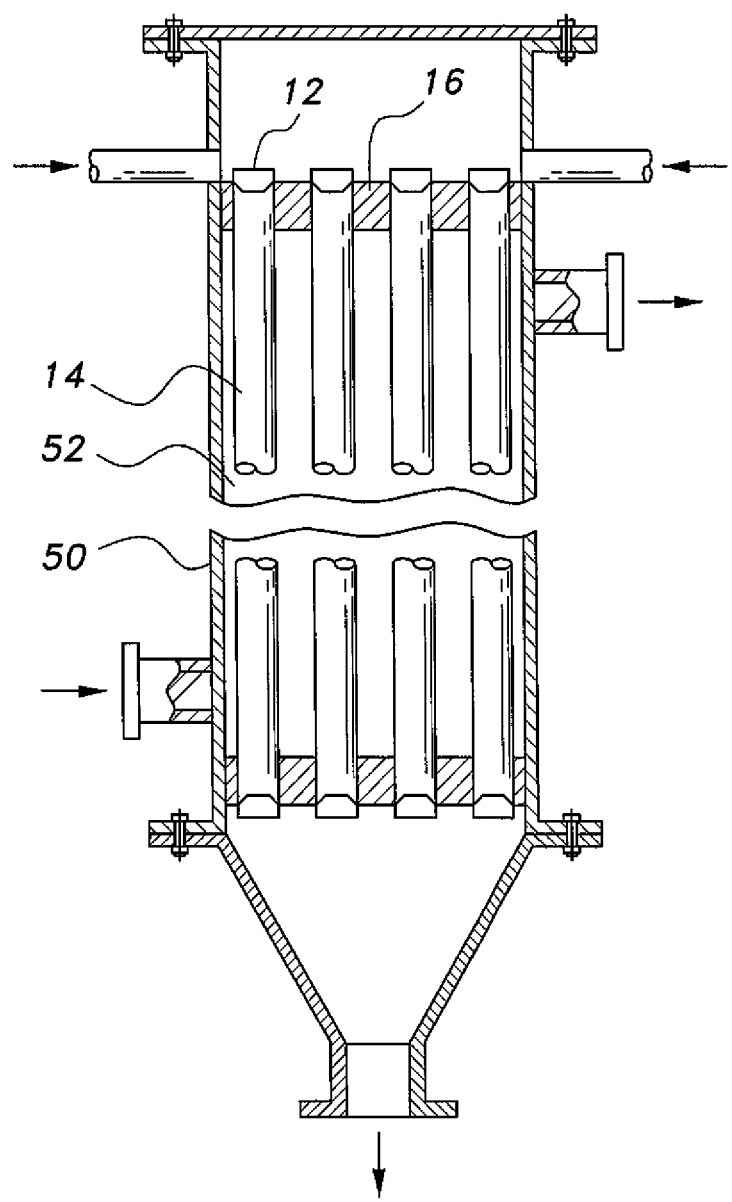
FIG. 7 is an environmental side view in section of an exemplary heat exchanger, illustrating the tube and tube sheet relationship therein.

FIG. 7 illustrates an example of the tube sheet 16 provided in a heat exchanger 50. The tube sheet 16 extends along the interior of the exchanger chamber 52. One or more tubes 14 are connected to the tube sheet 16, and a tube sleeve 12, which has been friction-welded to the tube 14. As illustrated, the tube sheet 16 supports and/or isolates one or more tubes 14 in heat exchanger 50.

Figure 8:
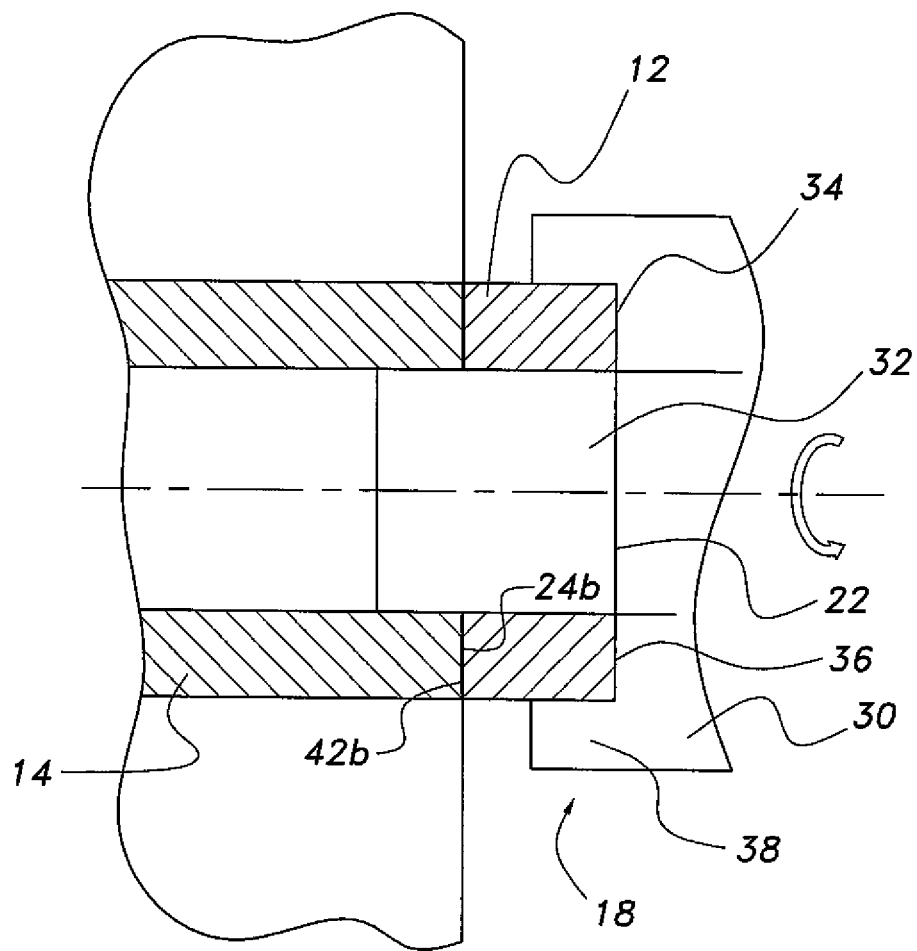
FIG. 8 is an environmental partial side view in section of the apparatus for joint sealing using tube expansion and friction welding of FIG. 1, illustrating the tube sleeve in operative engagement with the tube and tube sleeve having respective flat edges.

FIG. 8 illustrates that the tube-to-tube sheet joint sealing can also be achieved in cases in which the tube 14 and tube sleeve 12 have generally flat ends. As shown, similar to the beveled end connection in FIG. 4, in this case, the tube 14 has a generally flat edge 42b adapted to receive the tube sleeve flat edge 24b. The method of forming a secure joint via friction welding is similar to that of the disclosed beveled edge configuration.

The method of tube-to-tube sheet joint sealing via tube expansion and friction welding is disclosed hereinafter. Friction welding generates heat through mechanical friction between the tube sleeve 12 and the tube 14. The addition of a lateral force called "upset" plastically displaces and fuses the tube sleeve 12 to the tube 14. The end 15 of the tube 14 is beveled at a desired angle using a standard pipe cutting or tube beveling apparatus. The tube sleeve's first end 20 is also beveled at an angle complementary to the angle of the end 15 of the tube 14, forming a surface 24 suitable for engagement with the beveled tube surface 42.

The tube 14 and tube end 15 are inserted into the tube sheet 16 such that that the edge of the tube 14 is proximate to the surface 44 of the tube sheet 16, as shown in FIG. 5. Next, a tube expansion device 60 is connected to the tube 14 and expands the tube's outer surface 46 into sealed engagement with the opening 17 in the tube sheet 16.

Tube expansion may be achieved through several methods generally known, such as roller expansion or hydraulic expansion. In hydraulic expansion, the hydraulic expansion assembly 60 applies fluid at a high internal pressure into the tube 14 and/or sleeve 12, forming a tight joint between the tube 14 and tube sheet 16. The fluid may be water initially at a low pressure, which is intensified to a higher setting and held for the time required to accomplish a stable plastic condition of the tube 14. By expanding the tube 14 inside the tube sheet 16, swaging ensures that any space between the outer wall 46 of the tube 14 and the opening 17 of the tube sheet 16 is forced closed.

Alternatively, the tube 14 is expanded using a device with tapered cylinders that are mounted symmetrically around a long mandrel. The mandrel is inserted in the tube 14 and rotated. The tube expansion is caused by axial advancement of the roller mandrel.

Figure 9:
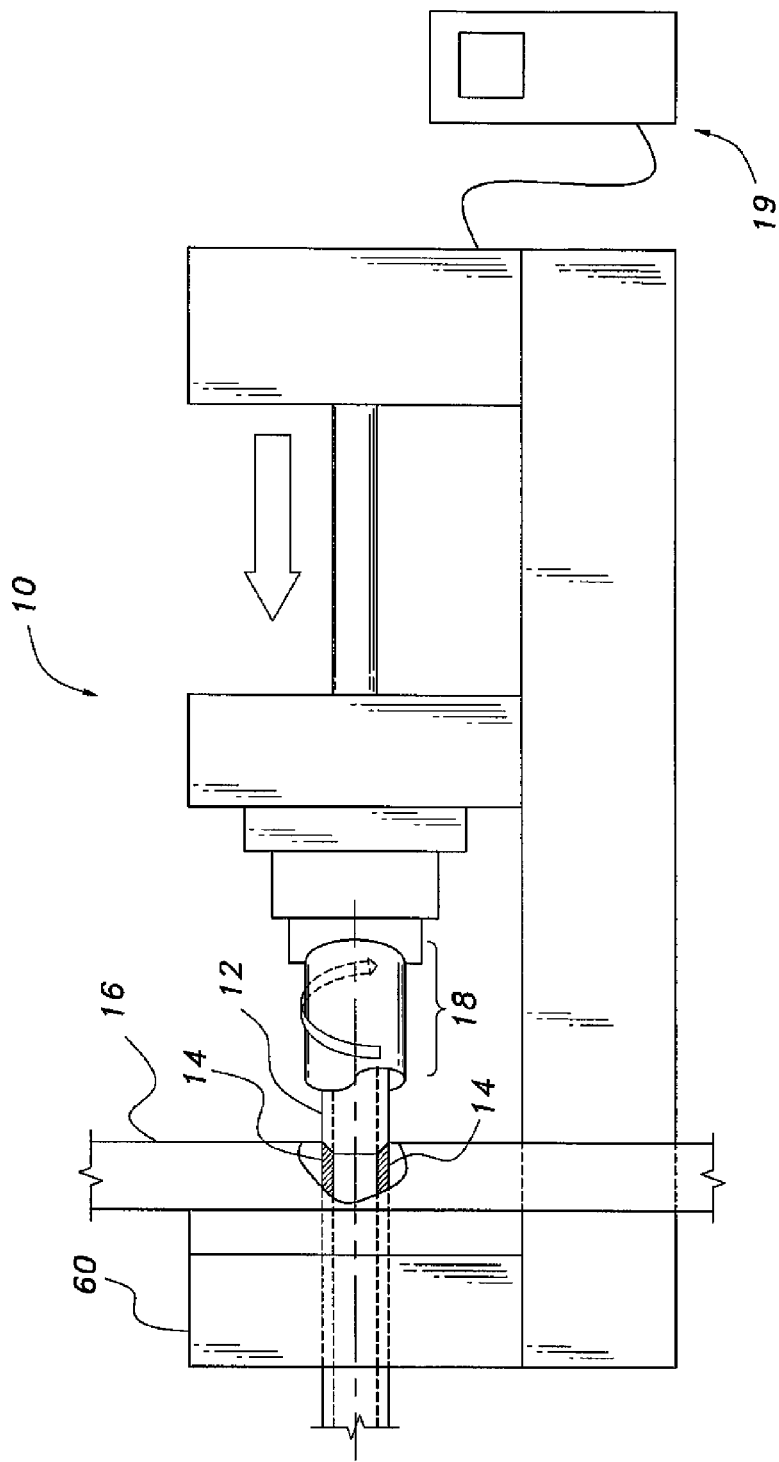
FIG. 9 is a partial environmental side view of the apparatus for joint sealing using tube expansion and friction welding of FIG. 1 with portions broken away and partially in section, shown during the friction welding process to illustrate the tube sleeve in operative engagement with the tube.

After the tube 14 is expanded in the tube sheet 16, the friction welding apparatus 10 with the clamping assembly 18 engages the tube sleeve 12. The tube sleeve 12 is positioned in the aperture 26 formed in the gripper 38 of the clamping assembly 18. The collet 30 and mandrel 32 move the tube sleeve 12 into engagement with the tube 14 such that the beveled surface 24 of the tube sleeve 12 and beveled edge 42 of the tube 14 are engaging, as illustrated in FIGS. 4 and 9.

During friction welding, a pre-weld thrust places the tube sleeve 12 and tube 14 in contact and under a load by the clamping assembly 18 to a predetermined pressure. This step is done without linear reciprocating motion or oscillation from the clamping assembly 18. In a first friction phase, the tube sleeve 12 and tube 14 receive a light load, as well as oscillation from the clamping assembly 18. In a second friction phase, the tube sleeve 12 is under an increased load, and the mandrel 32 is rotated and oscillated by a motor rotating the spindle 21 of the apparatus 10. In a forging phase, motion of the clamping assembly 18 is reduced, and a forge-force is applied to the tube sleeve 12 and tube 14. After the forging phase is completed, the clamping assembly 18 releases the tube sleeve 12, and the clamping assembly 18 is retracted and moved to another opening 17 to repeat the process.

It is to be understood that the present invention is not limited to the embodiments described above, but encompasses any and all embodiments within the scope of the following claims.

We claim:

1. An apparatus for joint sealing using tube expansion and friction welding for sealing a tube to a tube sheet, comprising
    a clamping assembly including a collet and a mandrel;
    a tube sheet having at least one aperture formed therein;
    at least one elongate tube positioned in the at least one aperture of the tube sheet, the tube having a first end having an edge;
    at least one elongate tube sleeve having a first end having an edge complementary to the edge of the tube, the edge of the at least one tube sleeve abutting the edge of the at least one tube within the tube sheet aperture, the tube sleeve having a second end adapted for being releasably gripped by a clamping assembly of a friction welding apparatus, wherein the collet having a base adapted for gripping the tube sleeve, the mandrel being sized and configured for extension through the tube sleeve and into the tube and adapted to be friction welded thereto and thereby sealed to the tube sheet;
    a motorized spindle assembly, the spindle assembly releasably gripping the clamping assembly; and
    a tube expansion apparatus having means for expanding the tube while an end of the tube is inserted into the at least one aperture in the tube sheet to swage the end of the tube in the tube sheet;
    wherein the swaged end of the tube is abutted against the tube sleeve in the hole in the tube sheet with the mandrel extending through the tube sleeve into the tube and the spindle assembly is rotated to friction weld the tube and the tube sleeve to the tube sheet, thereby sealing the joint between the tube and the tube sheet.

2. The apparatus for joint sealing according to claim 1, wherein the collet has a recess formed therein forming a gripper configured to receive the tube sleeve.

3. The apparatus for joint sealing according to claim 1, wherein the means for expanding the tube comprises a hydraulic expansion apparatus.

4. The apparatus for joint sealing according to claim 1, wherein the means for expanding the tube comprises a roller expansion apparatus.

5. A method of joint sealing using tube expansion and friction welding, comprising the steps of:
    providing a tube sleeve having a generally cylindrical configuration and first and second ends the first edge having a beveled edge;
    engaging a clamping assembly of a friction welding apparatus to the second end of the tube sleeve, the clamping assembly including a mandrel and collet adapted to operatively engage with the tube sleeve;
    providing a tube sheet having a generally planar configuration and at least one aperture formed therein;
    providing a tube having a tube end defining an edge beveled at an angle complementary to the beveled edge of the tube sleeve;
    positioning the tube end having the beveled edge in a corresponding aperture in the tube sheet;
    expanding the tube to securely engage the tube end with the tube sheet;
    moving the clamping assembly to engage the beveled edge of the tube sleeve to the beveled edge of the tube and to position the mandrel in engaging relation within the tube;
    rotating the clamping assembly to friction weld the tube sleeve to the tube to join the tube to the tube sleeve and to seal the tube to the tube sheet; and
    releasing the tube sleeve from the clamping assembly.

6. The method of joint sealing according to claim 5, wherein the step of expanding of the tube comprises applying hydraulic pressure from within the tube.

7. The method of joint sealing according to claim 5, wherein the step of expanding comprises rotating a roller tube assembly within the tube.

8. The method of joint sealing according to claim 5, wherein the step of moving the clamping assembly further comprises exerting pressure on the clamping assembly to apply a forging force between the beveled edges of the tube and the tube sleeve.

9. The method of joint sealing according to claim 5, wherein the step of rotating the clamping assembly includes oscillating the clamping assembly to form a friction weld.

10. The method of joint sealing according to claim 5, father including the step of cutting a portion of the tube to form the tube sleeve so that the tube sleeve and the tube have substantially similar outer and inner diameters before the tube is expanded.

* * * * *